US007620941B1

(12) United States Patent
Leventhal

(10) Patent No.: US 7,620,941 B1
(45) Date of Patent: Nov. 17, 2009

(54) MECHANISM FOR LOSSLESS USER-LEVEL TRACING ON AN ARCHITECTURE SUPPORTING PC-RELATIVE ADDRESSING

(75) Inventor: Adam H. Leventhal, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 977 days.

(21) Appl. No.: 11/102,009

(22) Filed: Apr. 8, 2005

(51) Int. Cl.
*G06F 9/44* (2006.01)
(52) U.S. Cl. .................. 717/128; 717/124; 717/125; 717/126; 717/127; 717/129; 717/130; 717/131; 717/132; 717/133; 717/134
(58) Field of Classification Search .......... 717/124–135
See application file for complete search history.

(56) References Cited

U.S. PATENT DOCUMENTS 6,295,644 B1 * 9/2001 Hsu et al. ................... 717/158
6,327,704 B1 * 12/2001 Mattson et al. ............. 717/153

OTHER PUBLICATIONS

Tamches, "Fine-Grained Dynamic Instrumentation of Commodity Operating System Kernels", University of Wisconsin, 2001.*

* cited by examiner

*Primary Examiner*—Wei Y Zhen
*Assistant Examiner*—Junchun Wu
(74) *Attorney, Agent, or Firm*—Osha • Liang LLP

(57) ABSTRACT

A method for tracing an instrumented program involves triggering a probe in the instrumented program, obtaining an original instruction associated with the probe, storing the original instruction into a scratch space, storing a jump instruction for an architecture that supports pc-relative addressing into the scratch space, wherein the jump instruction includes a next program counter value, executing the original instruction in the scratch space using a thread, and executing the jump instruction in the scratch space using the thread.

13 Claims, 4 Drawing Sheets

MECHANISM FOR LOSSLESS USER-LEVEL TRACING ON AN ARCHITECTURE SUPPORTING PC-RELATIVE ADDRESSING

BACKGROUND

Analyzing the dynamic behavior and performance of a complex software system is difficult. Typically, analysis of a software system is achieved by gathering data at each system call and post-processing the data. Data is gathered at each function call by placing a probe at locations of interest in the software (i.e., instrumenting the software to obtain an instrumented program) and gathering data when the probe is encountered by the thread executing the instrumented program.

Probe points are typically implemented in the instrumented code as trap instructions. The location (i.e., address) of each trap instruction is stored in a look-up table and associated with an original instruction (i.e., the instruction that is replaced by a trap when the program is instrumented).

When a thread executing the instrumented program encounters a trap instruction, control is transferred to a trap handler, which calls into the tracing framework and performs the actions associated with the corresponding probe. The trap handler then looks up the original instruction in the look-up table. The trap instruction is then overwritten by the original instruction (i.e., the original instruction is placed back in its original location within the code path replacing the trap instruction that was just executed). The tracing framework then single-steps the original instruction (i.e., the original instruction is executed and then control is returned to the kernel). The original instruction in the code path is then overwritten by the trap instruction that was originally encountered by the thread. The thread then resumes executing the instrumented program In a system in which more than one thread is executing within a given instrumented program, a particular thread may not trigger a probe (i.e., execute a trap instruction) if another thread has executed the trap and is in the process of single-stepping the original instruction. This situation typically occurs when a first thread encounters the trap instruction and overwrites it with a corresponding original instruction, and while this is occurring, a second thread encounters the original instruction. In this scenario, the first thread calls into the tracing framework to perform the actions associated with the probe, while the second thread executes the original instruction and so does not enter the trap handler and does not call into the tracing framework. The aforementioned method for instrumenting a program is typically referred to as "lossy" (i.e., all the requested tracing information is not obtained because, in certain scenarios such as the one described above, a probe within a give code path may not be encountered by all executing threads).

Alternatively, the original instructions may be replaced with a reserved trap instruction, and when a thread executing the instrumented program encounters the reserved trap instruction, all threads executing in the instrumented program are suspended while the thread that caused the trap single-steps the original instruction, which is temporarily written over by the trap instruction, as defined above. Note that by suspending all the threads executing when the trap is encountered by one of the threads, the execution of the tracing framework is effectively serialized, which can perturb the effects under observation. After the thread has single-stepped the original instruction, the instruction that was encountered by the thread is copied back over the original instruction in the code path. All threads executing in the instrumented program then resume executing the instrumented program. The aforementioned method for instrumenting a program is typically referred to as "lossless" (i.e., all the requested tracing information is obtained because the threads executing the instrumented program encounter all the probes in the code path in which they are executing).

Every location in a computer's memory is given an address. The content at a given memory location can be accessed by specifying the address (known as addressing). In pc-relative addressing, the address of the desired memory location is computed using the current value of the program counter (PC). The AMD64 instruction set architecture developed by Advanced Micro Devices (AMD) Corporation (Sunnyvale, Calif.), and the Nocona architecture developed by Intel Corporation (Santa Clara, Calif.) are both examples of architectures that support pc-relative addressing.

SUMMARY

In general, in one aspect, the invention relates to a method for tracing an instrumented program. The method comprises triggering a probe in the instrumented program, obtaining an original instruction associated with the probe, storing the original instruction into a scratch space, storing a jump instruction for an architecture that supports pc-relative addressing into the scratch space, wherein the jump instruction includes a next program counter value, executing the original instruction in the scratch space using a thread, and executing the jump instruction in the scratch space using the thread.

In general, in one aspect, the invention relates to a system for tracing an instrumented program on a processor that supports pc-relative addressing. The system comprises a thread configured to execute the instrumented program, a look-up table arranged to store an address and a corresponding original instruction, a trap handler configured to halt execution of the thread when a trap instruction is encountered, use an address of the trap instruction to obtain the corresponding original instruction from the look-up table, and generate a jump instruction for an architecture that supports pc-relative addressing to an address in the instrumented program, a scratch space arranged to store the original instruction and the jump instruction, and an execution facility for executing the original instruction to collect data and executing the jump instruction, wherein the execution facility is a processor supporting pc-relative addressing.

Other aspects of the invention will be apparent from the following description and the appended claims.

DETAILED DESCRIPTION

Figure 1:
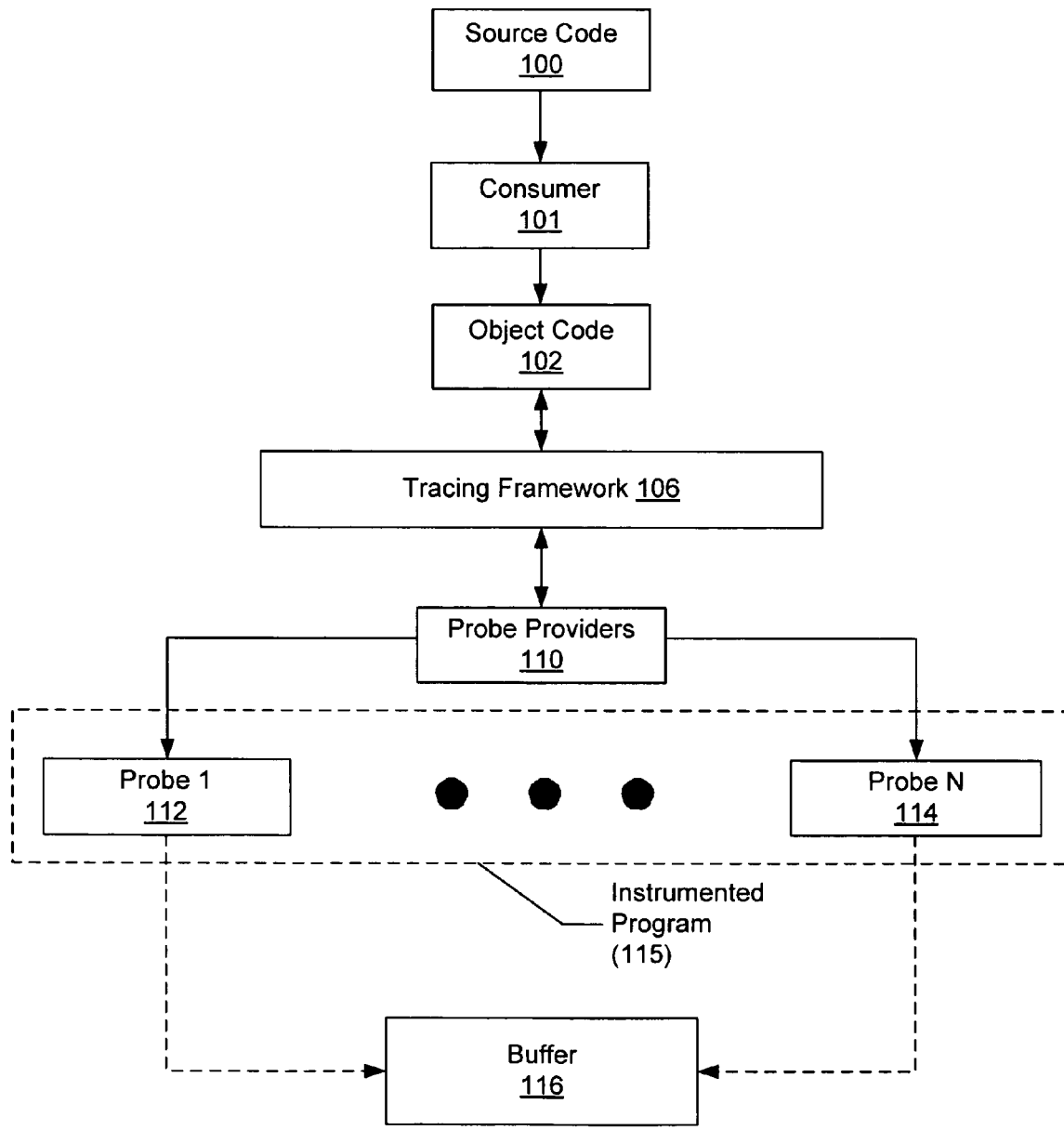
FIG. 1 shows a tracing framework architecture in accordance with an embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to methods and apparatus for tracing an instrumented program. More specifically, one or more embodiments of the invention relate to lossless tracing of an instrumented program on an architecture that supports pc-relative addressing (e.g., AMD64, Intel Corporation's Nocona, or other compatible architectures).

FIG. 1 shows a flow diagram detailing the collection of data in accordance with one embodiment of the invention. Specifically, FIG. 1 provides an overview of the process for collecting data for a buffer (116). Initially, source code (100) is written/obtained/generated that defines a tracing function (i.e., a request to obtain certain data). More specifically, the tracing function defines which probes (112, 114) to enable within the instrumented program (115), and what actions the tracing framework (106) is to perform when the probes (112, 114) are triggered (i.e., when a thread executing the instrumented program (115) encounters the probes (112, 114)). In one or more embodiments of the invention, a tracing function may define one or more actions that the tracing framework (106) is to perform when the probes (112, 114) is encountered.

The source code (100) is typically associated with a consumer (101). Note that a consumer (101) may define one or more tracing functions. The consumer (101) is a virtual client that sends requests, in the form of tracing functions, to the tracing framework (106) to obtain information about the instrumented program (115). Further, the consumer (101) also retrieves the requested information, which is stored by the tracing framework (106) in the associated buffer (116).

The source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115).

The probes (112, 114) gather the specified information from the instrumented program (115), as defined by the object code (102) derived from the actions defined within the source code (100), and forward the information (directly or indirectly) to a corresponding buffer (116).

In one or more embodiments of the invention, each probe (112, 114) in the instrumented program (115) is represented by a trap instruction. The address corresponding to location of the trap instruction within the instrumented program (115) is recorded in a look-up table along with the original instruction (i.e., the particular instruction that the consumer would like to execute to obtain data). In one embodiment of the invention, the original instruction corresponds to an action that is to be performed when the probe (112, 114) is encountered. The action, as noted above, is typically defined by the consumer (101). In one embodiment of the invention, representing each probe as a trap instruction and generating a corresponding look-up table may be performed by the tracing framework (106).

Prior to the collection of tracing information, one or more probes (112, 114) are activated per a consumer (101) request.

The activation of a probe, in accordance with one embodiment of the invention, also includes replacing the original instruction in the instrumented program (115) with a trap instruction, storing the address of the trap instruction and the associated original instruction in a look-up table. In one embodiment of the invention, the scratch space is allocated each time a thread is created.

Figure 2:
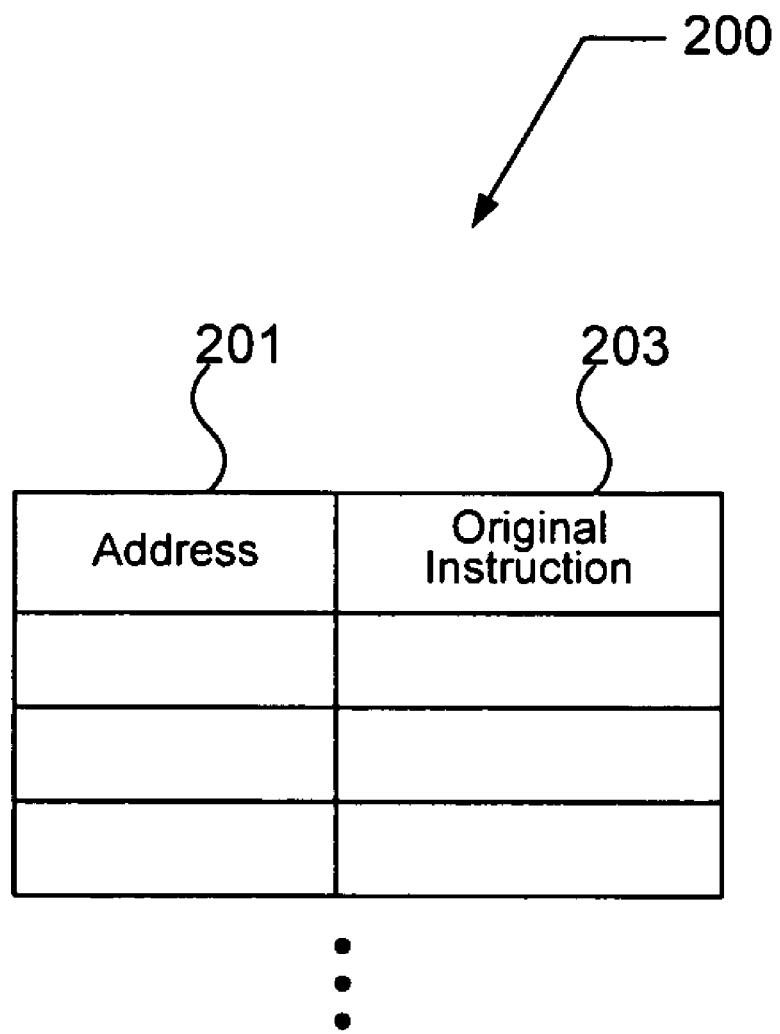
FIG. 2 shows a look-up table layout in accordance with one embodiment of the invention.

FIG. 2 shows a look-up table layout in accordance with one embodiment of the invention. As shown in FIG. 2, the look-up table (200) includes one or more entries each of which may include an address field (201) storing the address of the trap instruction within the instrumented program (115) and an original instruction field (203) storing the original instruction. The look-up table (200) may also store additional ancillary information needed to specify the address.

Figure 3:
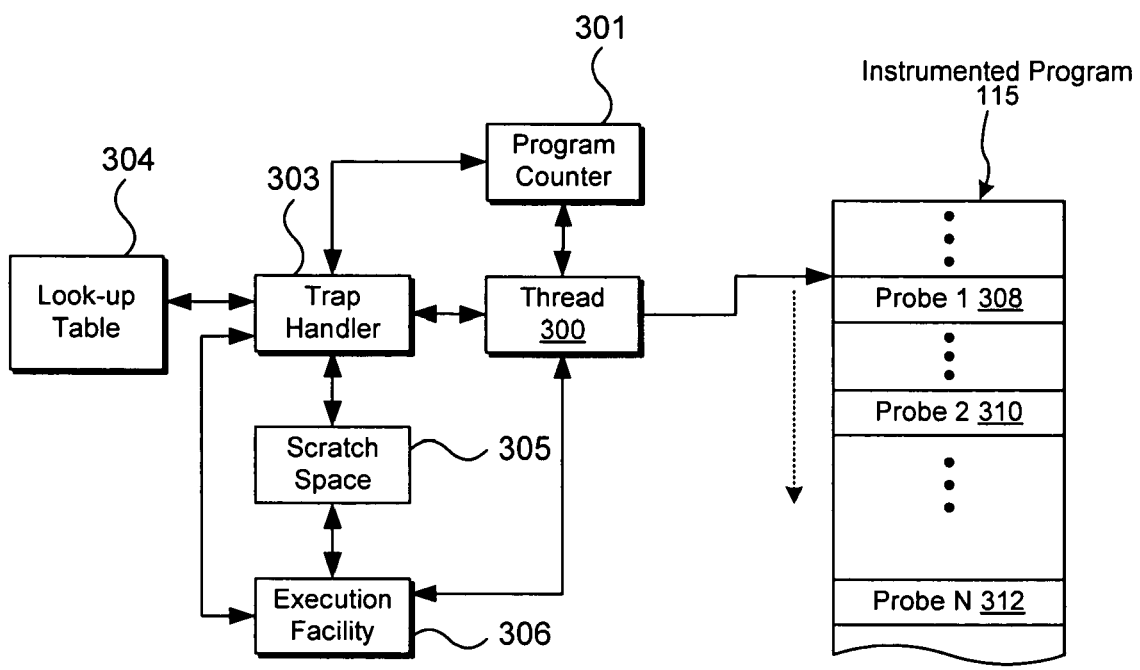
FIG. 3 shows a flow diagram in accordance with one embodiment of the invention.

FIG. 3 shows a flow diagram in accordance with one embodiment of the invention. More specifically, FIG. 3 shows a flow diagram detailing the mechanism for collecting data using a probe in accordance with one embodiment of the invention. Each component in FIG. 3 may be implemented by one or more software modules, hardware components, or any combination thereof. Further, each component shown in FIG. 3 may be distributed across one or more processors.

In FIG. 3, a program counter (301) stores a value corresponding to a current address of a thread (300) executing in the instrumented program (115). When a probe (308, 310, 312), represented by a trap instruction, is encountered by the thread (300), the thread (300) transfers control to a trap handler (303). More specifically, when a probe (308, 310, 312) is encountered, a trap is triggered which is subsequently handled by the trap handler (303). The trap handler (303) searches the look-up table (304), using the program counter (301) value, to obtain the original instruction associated with the probe (308, 310, 312). In addition, the trap handler (303) calls into the tracing framework (106) to perform actions associated with the trap instruction. Those skilled in the art will appreciate that various machine architectures may require additional information, aside from the program counter, to generate an address that may then be used to obtain the original instruction. In this embodiment, the trap handler (303) includes functionality to obtain such information.

The original instruction is evaluated to determine whether the instruction is a position-dependent instruction (i.e., an instruction that consumes or modifies the value of the program counter). Control-flow instructions, i.e., a branch instruction, a function call, and explicit reading of the program counter, are a specific example of position-dependent instructions. The AMD64 architecture is an example of an architecture that supports what is known as program counter-relative (pc-relative) addressing. With pc-relative addressing, any instruction that references memory may be a position-dependent instruction.

If the original instruction is not a position-dependent instruction (i.e., does not reference memory), the original instruction is stored to a corresponding scratch space (305). The scratch space (305) is typically a small address range or allocation of an address space that is used to temporarily store the original instruction. In one or more embodiments of the invention, the scratch space resides in the traced application as opposed to the kernel. In one embodiment of the invention, the scratch space is allocated each time a thread is created. If the system upon which the tracing framework (106) executes supports multiple threads in a process, then the scratch space (305) is allocated on a per-thread basis. In one or more embodiments of the invention, the trap instruction is no larger than the size of the smallest original instruction that is to be replaced.

Continuing with the discussion of FIG. 3, after storing the original instruction, the trap handler (303) generates and stores a jump instruction. A jump instruction transfers program control to a different point in the instruction stream without recording return information, thus not affecting any system state other than the program counter. The stored jump instruction includes the next program counter value as the destination address (i.e., transfers the thread's control flow to the next instruction in the instrumented program to execute).

The trap handler (303) sets the program counter to point to the original instruction in the scratch space (305) and control is returned to the thread (300). The execution facility (306) executes the original instruction in the scratch space (305) and then executes the jump instruction. In one embodiment of the invention, the execution facility (306) is a processor with an AMD64 architecture or an architecture that is backward compatible with the AMD64 architecture. The execution of the jump instruction transfers program control out of the scratch space (305) and back to the next instruction in the instrumented program.

In one embodiment of the invention, if the original instruction is a position-dependent strictly by virtue of employing pc-relative addressing, then the trap handler (303) moves the address of the traced instruction (i.e., what would normally be the value of the program counter) into register A (not shown) which is a register not used by the original instruction. The trap handler (303) modifies the original instruction so it now depends on register A and not the actual program counter. The modified instruction is then stored in the scratch space (305) by the trap handler (303). In one embodiment of the invention, the trap handler (303) generates and stores a move instruction, e.g., an AMD64 movq instruction, into the scratch space (305). The stored move instruction includes the data necessary to restore the value of register A following execution of the modified instruction. Next, the trap handler (303) generates and stores a jump instruction, e.g., an AMD64 jmp instruction, into the scratch space (305). The stored jump instruction includes the next program counter value as the destination address (i.e., points the thread to the next instruction in the instrumented program to execute). The next program counter value may be obtained by simply adding the size of the original instruction to the address of the traced instruction (i.e., what would normally be the value of the program counter), keeping in mind the original instruction is not a control-flow instruction.

In one embodiment of the invention, if the original instruction is a control-flow instruction or is otherwise position-dependent but not a pc-relative instruction, then the instruction is emulated in software. The program counter as well as any other state in the system that would be modified by the native execution of the original instruction are updated based on the results of the emulation. The trap handler then returns control to the thread (300) at the location indicated by the program counter (301) after the emulation is completed.

Figure 4:
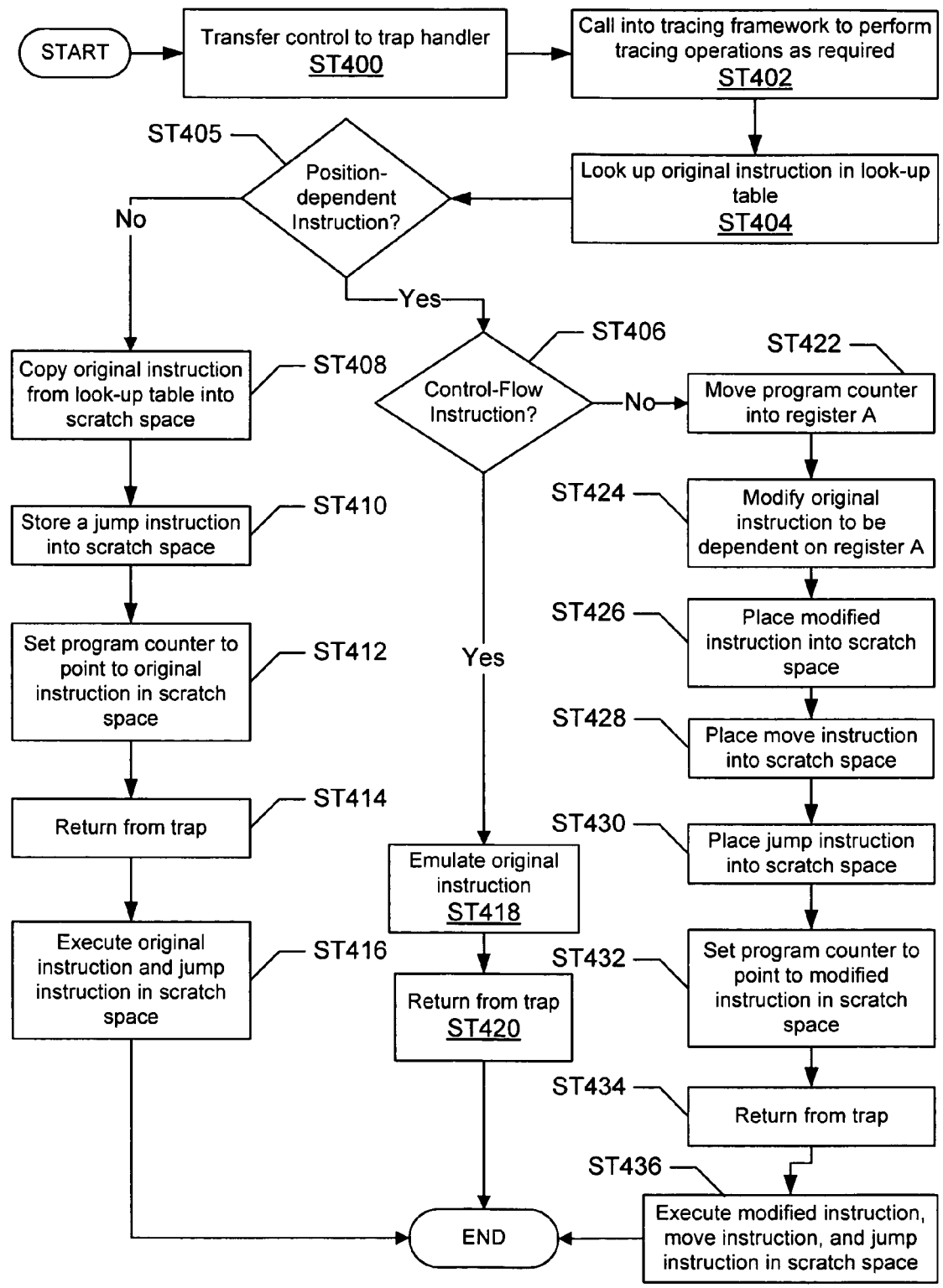
FIG. 4 shows a flow chart in accordance with one embodiment of the invention.

FIG. 4 shows a flowchart detailing the steps that occur when a probe (e.g., a trap instruction corresponding to a probe) is encountered by a thread executing the instrumented program in accordance with one embodiment of the invention. When a thread executing the instruction is encountered, the thread executing the trap instruction transfers control to an appropriate trap handler (Step 400). The trap handler calls into the tracing framework to perform tracing operations as required (Step 402). In one or more embodiments of the invention, the tracing framework performs a tracing operation and generates corresponding tracing information. The tracing information may include, but is not limited to, an argument, a pointer value, a name of a function call, etc. In addition, the tracing operation may correspond to consumer-specified actions that the tracing framework is to perform when the particular trap instruction is encountered.

Continuing with FIG. 4, after the trap handler has made the appropriate calls into the tracing framework, the trap handler queries the original instruction in the look-up table using the location of the trap instruction (and additional information as required) (Step 404). The original instruction is evaluated to determine whether the instruction is a position-dependent instruction (Step 405). If the original instruction is not a position-dependent instruction, then the original instruction is copied into a scratch space (which may be allocated on a per-thread basis) (Step 408). The trap handler then places a jump instruction in the scratch space (Step 410). The jump instruction includes the next program counter value (i.e., redirects the thread to the next instruction in the instrumented program to execute). The next program counter value may be obtained by simply adding the size of the original instruction to the current value of the program counter.

Once the original instruction and the jump instruction, e.g., an AMD64 jmp instruction, are stored into the scratch space, the program counter is updated to point to the original instruction in scratch memory (Step 412). Control is returned to the thread that initially executed the trap instruction (Step 414) whereupon the execution facility executes the original instruction and the jump instruction (Step 416). Thus, once the original instruction has been executed, the jump instruction is executed, transferring program control out of the scratch space and back to the next instruction in the instrumented program. One skilled in the art can appreciate that Step 416 is typically performed at user level, while the other steps shown in FIG. 4 are typically performed at the kernel level.

If the original instruction is a position dependent instruction (Step 405), then the instruction is evaluated to determine whether the instruction is a control-flow instruction (Step 406). If the original instruction is a position dependent (specifically a pc-relative instruction) instruction (Step 405) but not a control-flow instruction (Step 406), then the program counter in moved into register A (Step 422), which is a register not used by the original instruction. The original instruction is modified to be dependent on register A and not the actual program counter (Step 424). The modified instruction is copied into a scratch space (which may be allocated on a per-thread basis) (Step 426). The trap handler then places a move instruction in the scratch space (Step 428), which includes the necessary data to restore the original value of register A following execution of the modified instruction. The trap handler then places a jump instruction, e.g., an AMD64 jmp instruction, in the scratch space (Step 430). The jump instruction includes the next program counter value (i.e., points the thread to the next instruction in the instrumented program to execute). The next program counter value may be obtained by simply adding the size of the original instruction to the current value of the program counter.

Once the modified instruction, the move instruction and the jump instruction, e.g., an AMD64 movq instruction and an AMD64 jmp instruction respectively, have been stored into the scratch space, the program counter is updated to point to the modified instruction in scratch memory (Step 432). Next, control is returned to the thread that initially executed the trap instruction (Step 434) whereupon the execution facility executes the modified instruction, the move instruction and the jump instruction (Step 436). Thus, once the modified instruction has been executed, the move instruction and jump instruction are executed, restoring the value of register A and transferring program control out of the scratch space and back to the next instruction in the instrumented program. One skilled in the art can appreciate that Step 436 is typically performed at user level, while the other steps shown in FIG. 4 are typically performed at the kernel level.

If the original instruction is a position-dependent instruction (Step 405) (but not a pc-relative addressing instruction) and a control flow instruction (Step 406), then the instruction is emulated in software (Step 418). The program counter as well as any other state in the system that would be modified by the native execution of the original instruction is updated based on the results of the emulation and control. The trap handler then returns control to the thread at the location indicated by the program counter upon completion of the emulation (Step 420).

One or more embodiments of the invention provide an efficient means for collecting information about an instrumented program. Specifically, embodiments of the invention provide a manner to collect tracing information in multi-thread environment executing on a processor that supports pc-relative addressing such as the AMD64 architecture or Nocona architecture. Embodiments of the invention also provide a manner for executing the original instruction replaced by a trap instruction without requiring that the original instruction be single-stepped using the hardware support provided in an AMD64 architecture or other compatible architectures that support pc-relative addressing. Further, only a single context switch (or control transfer) is required to resume execution of the thread while tracing an instrumented program.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for tracing an instrumented program comprising:
    triggering a probe in the instrumented program;
    obtaining an original instruction associated with the probe;
    copying a program counter value into a register not used by the original instruction if the original instruction is a position-dependent instruction but not a control-flow instruction, the original instruction dependent on a program counter comprising the program counter value;
    obtaining a modified instruction by modifying the original instruction to be dependent on the register holding a copy of the program counter value;
    storing the modified instruction into a scratch space;
    storing a move instruction for an architecture that supports program counter (pc)-relative addressing into the scratch space, wherein the move instruction comprises data for restoring an original value of the register holding the copy of the program counter value;
    storing a jump instruction for the architecture that supports pc-relative addressing into the scratch space, wherein the jump instruction includes a next program counter value;
    executing the modified instruction in the scratch space using the thread;
    executing the move instruction in the scratch space using the thread to restore the original value of the register; and
    executing the jump instruction in the scratch space using the thread.

2. The method of claim 1, further comprising:
    if the original instruction is the control-flow instruction:
        emulating the original instruction to determine the next program counter value; and
        returning control to the thread at an address of the next program counter value.

3. The method of claim 1, further comprising:
    determining the next program counter value by incrementing a value of the program counter using a size of the original instruction.

4. The method of claim 1, wherein the probe corresponds to a trap.

5. The method of claim 1, wherein obtaining the original instruction comprises:
    searching a look-up table using the program counter value, wherein the look-up table comprises the original instruction associated with the probe and an address associated with the original instruction.

6. The method of claim 1, wherein the scratch space is allocated on a per-thread basis.

7. The method of claim 1, wherein the instrumented program is executed on a multi-thread architecture.

8. A system for tracing an instrumented program comprising:
    a processor that supports program counter (pc)-relative addressing, the processor for executing a thread configured to execute the instrumented program;
    a memory configured to store a look-up table arranged to store an address and a corresponding original instruction;
    a trap handler configured to;
        halt execution of the thread when a trap instruction is encountered,
        use an address of the trap instruction to obtain the corresponding original instruction from the look-up table,
        move a copy of a program counter to a register not used by the original instruction if the original instruction is a position-dependent instruction but not a control-flow instruction, the original instruction dependent on the program counter comprising a program counter value,
        obtain a modified instruction by modifying the original instruction to be dependent on the register holding the copy of the program counter value,
        generate a jump instruction for an architecture that supports pc-relative addressing to an address in the instrumented program, and
        generate a move instruction for an architecture that supports pc-relative addressing, wherein the move instruction comprises data for restoring the register holding the copy of the program counter value;
    a scratch space arranged to store the modified instruction, the move instruction, and the jump instruction; and
    an execution facility for:
        executing the original modified instruction to collect data,
        executing the move instruction to restore the register holding the copy of the program counter value, and
        executing the jump instruction, wherein the execution facility is the processor supporting pc-relative addressing.

9. The system of claim 8, further comprising:
    a buffer for storing data.

10. The system of claim 8, further comprising:
    a tracing framework configured to emulate the original instruction to determine a value of the program counter if the original instruction is the control-flow instruction and to return control to the thread at an address of the program counter value if the original instruction is the control-flow instruction.

11. The system to claim 8, wherein the trap handler sets a destination of the jump instruction to a next address immediately following an address of the trap instruction.

12. The system of claim 8, wherein the scratch space is allocated on a per-thread basis.

13. The system of claim 8, wherein the instrumented program is executed on a multi-thread architecture.

* * * * *

UNITED STATES PATENT AND TRADEMARK OFFICE
CERTIFICATE OF CORRECTION

| | | |
|---|---|---|
| PATENT NO. | : 7,620,941 B1 | Page 1 of 1 |
| APPLICATION NO. | : 11/102009 | |
| DATED | : November 17, 2009 | |
| INVENTOR(S) | : Adam H. Leventhal | |

It is certified that error appears in the above-identified patent and that said Letters Patent is hereby corrected as shown below:

In Claim 8, Column 8 (line 56), please delete "original".

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,620,941 B1 Page 1 of 1
APPLICATION NO. : 11/102009
DATED : November 17, 2009
INVENTOR(S) : Adam H. Leventhal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Twenty-sixth Day of October, 2010

David J. Kappos
*Director of the United States Patent and Trademark Office*